Dec. 14, 1965 P. J. CONNOLLY 3,223,231
RODENTICIDE AND FEEDING TRAY PACKAGE
Filed May 13, 1963
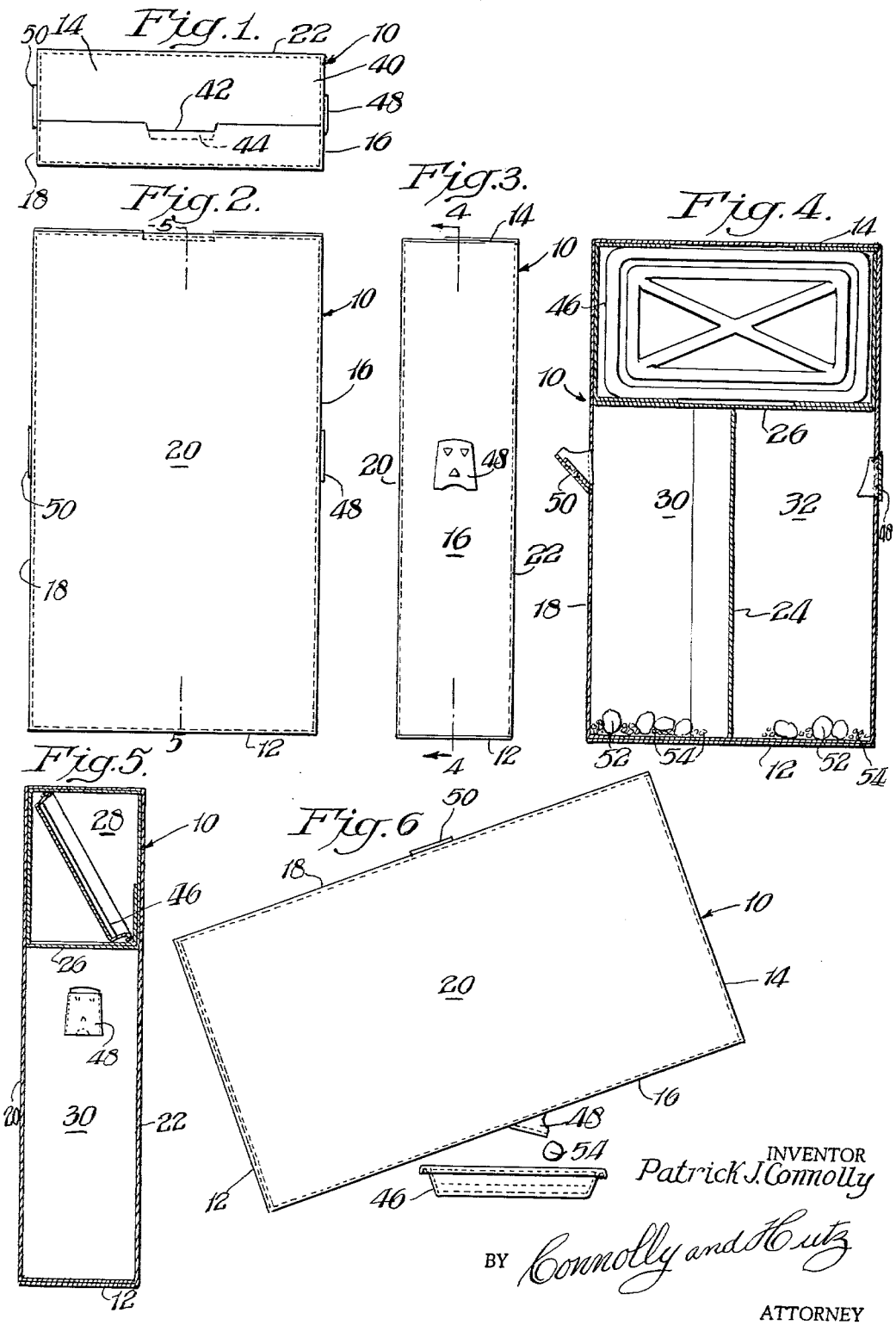
INVENTOR
Patrick J. Connolly
BY Connolly and Hutz
ATTORNEY United States Patent Office 3,223,231
Patented Dec. 14, 1965

3,223,231
RODENTICIDE AND FEEDING TRAY PACKAGE
Patrick J. Connolly, Bayshore, N.Y., assignor to Chas.
Pfizer & Co., Inc., New York, N.Y., a corporation of Delaware
Filed May 13, 1963, Ser. No. 279,886
1 Claim. (Cl. 206—47)

This invention relates to a rodenticide and more particularly to the physical configuration and type of killing action of the rodenticide.

For a rodenticide to be effective, careful consideration must be given to the living and feeding habits of the particular rodent. Existing rodent extermination methods have had varying degrees of success. Many serious drawback are inherent in conventional methods, such as the cheese-baited trap. When a rodent is killed on the spot, the rest of the pack becomes cautious and trap-shy. The same reaction occurs with quick-acting poisons, which cause bait-shyness. Delayed action poisons, while reducing bait-shyness, do not affect the young and less active rodents which remain in their nest. Another shortcoming of existing methods is the failure to cater to the rodent's desire for a choice of bait sizes and flavors. Some existing baits have an unappealing flavor, so that most rodents are not even attracted to them.

Accordingly, an object of this invention is to provide a rodenticide which is more efficient in killing young rodents in the nests as well as the more active rodents.

In accordance with this invention, the rodenticide is in the form of a mixture of solid flavored chunks and crums containing a feedstuff together with a delayed action poison, which may have an anti-coagulant as its active ingredient. The crumbs are consumed at the bait station. The combined chunk content and delayed action enables the rodent to carry some of the rodenticide back to his nest and also decreases the likelihood of the rodent dying near the bait station and making other rodents bait-shy. Advantageously a portion of the mixture is meat flavored and another portion is grain flavored to appeal to the particular preference of the rodent.

An ancillary feature of this invention is the provision of a hermetically sealed compartmentalized carton containing the different flavored rodenticide formulations. Feeding trays may also be in the carton to provide a compact package containing all the equipment necessary for exterminating rodents.

Novel features and advantages of the present invention will become apparent to one skilled in the art from a reading of the following description in conjunction with the accompanying drawings wherein similar reference characters refer to similar parts and in which:

FIG. 1 is a top plan view of an embodiment of this invention;

FIG. 2 is a front view in elevation of the embodiment of the invention shown in FIG. 1;

FIG. 3 is a side view in elevation of the embodiment of the invention shown in FIG. 1;

FIG. 4 is a cross-sectional view taken through FIG. 3 along the line 4—4;

FIG. 5 is a cross-sectional view taken through FIG. 2 along the line 5—5; and

FIG. 6 is a perspective view of the embodiment of the invention shown in FIG. 1.

As shown in FIG. 4 the rodenticide includes solid chnks 52 and crumbs 54 (each comprising a substantial amount of the mixture) of flavored rodenticide containing a delayed action poison having as its active ingredient an anti-coagulant such as 2-pivalyl-1,3-indandione which causes the rodent to bleed to death internally. The delayed action is desirable since it allows the rodent to quietly crawl away from the bait station and thus not make other rodents bait-shy. The chunk size appeals to the rodent's desire to bring food back to his nest for himself and to share with the young and less active rodents. The chunks are easy for a rodent to carry and thus, in combination with the delayed action poison, facilitate the complete extermination of an entire nest of rodents.

Since the degree of effectiveness of the rodenticide largely depends upon its ability to attract rodents, extreme care must be given in selecting proper flavors. The combination of meat flavor and grain flavor is particularly effective in attracting rats and mice and is thus advantageously used to flavor the rodenticide. The use of both flavors is desirable since some rodents might be attracted by one flavor and not the other. Additionally, rodents prefer a selection of food. Thus the provision of two flavors permits each rodent to eat cafeteria style, selecting the food he craves most. The grain flavor may be suitably provided by incorporation of ingredients such as ground corn and/or rolled oats; the meat flavor may be achieved by the addition of meat scraps or blood meal or other animal products to the formulation.

As shown in FIGS. 1 and 3, the rodenticide is packaged in a carton 10 having a bottom wall 12, a top wall 14 and side walls 16, 18, 20 and 22. Carton 10 may be cylindrically shaped, in which case side walls 16, 18, 20 and 22 would comprise one continuous side wall. Referring to FIG. 4, a feeding compartment partition 24 extends vertically from bottom wall 12 to a plane spaced below top wall 14. Partition 24 contacts opposite side walls 20, 22 and a tray compartment partition 26 to separate the lower portion of carton 10 into two feeding compartments 30, 32, each containing a different flavored rodenticide. The carton may have more than one feeding compartment partition to form a plurality of feeding compartments. Partition 26 is in the plane spaced below the top wall and contacts side walls 16, 18, 20 and 22 as well as partition 24 to form a tray compartment 28. The package is hermetically sealed so that the rodenticide placed in feeding compartments 30, 32 is maintained fresh and deadly as well as free from off-flavors.

Compartment 28 is provided with at least one feeding tray 46. Since two different flavor rodenticides are used, compartment 28 preferably contains at least two trays so that each rodenticide may be put in a separate tray. Trays 46 are nestled one inside the other and, if desired, may be positioned diagonally in compartment 28 as shown in FIG. 5 to occupy the minimum amount of space. Each of side walls 16, 18, 20, 22 has an integral extension or hinged flap which is bent inwardly to form top wall 14. As shown in FIG. 1 flap 38 extending from side wall 20 has a slot 42 while flap 40 extending from side wall 22 has a mating tongue 44 which is inserted into slot 42 to conveniently maintain top wall 14 closed. The flaps thus comprise a door which allows the easy removal and replacement of trays 46 from carton 10. If desired, tray compartment partition 26 may be removable from carton 10 to expose the upper portion of feeding compartments 30, 32 to facilitate filling the feeding compartment.

Feeding compartments 30, 32 are provided with dispensing doors 48, 50 for the dispensing of the rodenticides. In an advantageous form of the invention, doors 48, 50 comprise pour spouts on side walls 16, 18 respectively facing the top of each feeding compartment. The size of each door is larger than a single chunk in the feeding compartments so that no difficulty will be encountered in pouring the rodenticide from the feeding compartment and into tray 46 as shown in FIG. 6.

The package herein described comprises a compact unit containing all of the equipment necessary for exterminating rodents. Since the feeding trays are packaged along with the rodenticide, the problem of finding available bait containers for the rodenticide is obviated. Armed with a single compact package, the user need only go to the location where rodents are most likely to be found, remove trays 46 from compartment 28, and pour the rodenticide into the trays. The combined chunk and crumb content together with the delayed action is effective in killing the rodents remaining in the nest as well as the rodents at the bait station.

What is claimed is:

In combination, a rodenticide and a hemetically sealed carton for containing said rodenticide, said carton comprising a plurality of feeding compartments, said rodenticide being in the form of a mixture of solid flavored chunks and crumbs containing a feedstuff together with a delayed action poison, each of said feeding compartments containing a portion of said rodenticide, said rodenticide in each of said feeding compartments being of a different flavor than the rodenticide in the other of said feeding compartments, a tray compartment being in said carton, and said tray compartment containing at least one feeding tray.

References Cited by the Examiner
UNITED STATES PATENTS

| | | | |
|---|---|---|---|
| 2,813,058 | 11/1957 | Smith | 167—46 |
| 2,893,604 | 7/1959 | Critchlow | 222—129 |
| 2,898,004 | 8/1959 | Klausmann | 222—129 |
| 2,900,302 | 8/1959 | Correll | 167—46 |
| 2,957,804 | 10/1960 | Shuyler | 167—46 |
| 2,983,421 | 5/1961 | Turpin | 229—17 |
| 3,094,805 | 6/1963 | Luck | 43—131 |

OTHER REFERENCES

U.S. Dept. of Agriculture, Farmers' Bulletin No. 1533, June 1927 (col. 6 relied upon).

THERON E. CONDON, *Primary Examiner.*

JULIAN S. LEVITT, *Examiner.*